UNITED STATES PATENT OFFICE.

WILLIAM R. SEIGLE, OF NASHUA, NEW HAMPSHIRE.

PROCESS FOR MAKING INSULATING MATERIAL.

959,620.  Specification of Letters Patent.  Patented May 31, 1910.

No Drawing.  Application filed December 20, 1909. Serial No. 534,045.

*To all whom it may concern:*

Be it known that I, WILLIAM R. SEIGLE, a citizen of the United States, and resident of Nashua, in the county of Hillsboro and State of New Hampshire, have invented new and useful Improvements in Processes for Making Insulating Material, of which the following is a specification.

My invention relates to the art of producing refractory insulating material and consists in an improvement upon the process set forth in Letters Patent of the United States No. 865,606, granted to Charles L. Norton under date of Sept. 10, 1907. In that patent there is specifically described a method of impregnating a refractory body, consisting of asbestiform fiber cemented with magnesium hydrate, with a liquid hydrocarbon, preferably a hydrocarbon which is solid at ordinary temperatures, and which in order to be made to saturate the porous refractory material, is raised to a high temperature. Insulating materials made according to the said process are of high insulating property and dielectric strength and have the advantage also of being substantially homogeneous in structure and free from seams or faults. Especially is this true when the refractory material subjected to the saturation process has previously been made by such process as is described in Letters Patent of the United States No. 847,293 granted to Charles L. Norton March 12, 1907, whereby heavy pressure is employed in the formation of the sheet, slab or other article composed of the said refractory material. Even though such refractory material be prepared for saturation with liquid hydrocarbon by having the air exhausted as far as possible or practicable from its pores, and by being heated, it requires considerable time for the liquid hydrocarbon to penetrate thoroughly to all parts of the body being saturated, and this time, of course, increases with the bulk of the body under treatment.

My invention which is the subject of this specification, consists in an improvement by which substantially the same class of insulating material, as that above described, may be produced but with far greater celerity and therefore economy.

Taking, for example, the fiber concrete described in Patent No. 847,293, which is composed of asbestiform fiber mixed with magnesium oxid and water, and then subjected to heavy pressure accompanied by expression of surplus water while the magnesium oxid is undergoing hydration, I add to the original mixture of fiber and cementitious material a quantity of finely divided liquefiable solid hydrocarbon; for instance, the harder pitches or asphalts; in fact, any liquefiable hydrocarbon which is substantially solid at ordinary temperatures to admit of its being comminuted and effectively distributed through the mass of fiber which is one of the chief ingredients of the composition. I then proceed as before and as described in the said Patent No. 847,293, or I may carry out the process according to such modifications and improvements of the process described in the last aforesaid patent as are set forth in United States Patent No. 929,004, dated July 27, 1909. The resulting article of refractory material is a solid body through which the small fragments of liquefiable hydrocarbon are thoroughly distributed. The further step in this process is the complete impregnation of the body of composition prepared as above described with a hydrocarbon which may or may not be solid at ordinary atmospheric temperature, though I believe it to be preferable to select a hydrocarbon such as gilsonite which is hard at ordinary temperatures and requires a considerable rise of temperature in order to liquefy it thoroughly. Low melting point asphalts cannot be ground as they become gummy or sticky. Preferably, also, I thoroughly heat the sheet, slab or other article of refractory composition prepared as above described before immersing it in the hot liquefiable hydrocarbon which is to saturate it. This preliminary heating softens and may be carried to such temperature as to liquefy the included particles of hydrocarbon in the body; the heating also is effective to drive out a large proportion of the air inclosed in the pores of the composition. I then immerse the composition in a body of hot liquefied hydrocarbon which at once penetrates the porous refractory material. It is, I believe, also preferable to employ for the impregnating hydrocarbon the same as, or a closely similar substance to, that which in comminuted form is distributed through and included in the body of the refractory material. I also recommend that the temperature of the impregnating hydrocarbon be maintained at a degree sufficiently high to insure the thorough liquefaction of the included particles of the hydrocarbon in the refractory body.

The effect of the presence in the body of a large number of hydrocarbon particles which are either softened or liquefied by previous treatment or by the heating due to immersion in the path of hot liquid hydrocarbon, is to render the refractory composition extremely susceptible to and absorptive of the impregnating hydrocarbon liquid which penetrates to all portions of the refractory body with far greater celerity than in the case of a refractory body of similar nature but unprovided with included particles of hydrocarbon. I have observed some instances of the thorough impregnation of a refractory body of the character above described in one hour, whereas a similar body having similar dimensions but unprovided with included hydrocarbons, has required 24 hours of immersion before complete saturation.

The preparation of comminuted hydrocarbon to be added to the original mixture may vary considerably without sensibly affecting the final result. I have found in the case of gilsonite that about 10% by weight of gilsonite in the solid ingredients of the original mixture, suffices to prepare the product for subsequent impregnation with a similar hydrocarbon under the conditions above described.

What I claim and desire to secure by Letters Patent is:

1. The process which consists in first forming a compacted composition of fibrous material, cement and finely divided liquefiable solid hydrocarbon distributed therethrough, and then immersing the said composition in liquefied hydrocarbon at a temperature sufficiently high to liquefy the included hydrocarbon.

2. The process which consists in first forming a compacted composition of asbestiform fiber, a cement, and finely divided liquefiable solid hydrocarbon distributed therethrough and then immersing the said composition in liquefied hydrocarbon at a temperature sufficiently high to liquefy the hydrocarbon included in the composition.

3. The process which consists in first forming a compacted composition of asbestiform fiber cemented with magnesium hydrate and containing finely divided liquefiable solid hydrocarbon distributed therethrough, and then immersing the said composition in a liquefied body of the same hydrocarbon.

4. The process which consists in first forming a compacted composition of fibrous material, cement and finely divided liquefiable solid hydrocarbon, distributed therethrough, then heating the composition to a temperature sufficient to liquefy the included hydrocarbon, and thereafter immersing the hot composition in a liquefied hydrocarbon at a temperature sufficiently high to maintain the liquefaction of the included hydrocarbon.

5. The process which consists in first forming a compacted composition of asbestiform fiber, a cement, and finely divided liquefiable hydrocarbon distributed therethrough, then heating the composition to a temperature sufficiently high to liquefy the included hydrocarbon, and thereafter immersing the hot composition in liquefied hydrocarbon at a temperature sufficiently high to maintain the liquefaction of the included hydrocarbon.

6. The process which consists in first forming a composition of asbestiform fiber cemented with magnesium oxid, and containing finely divided liquefiable solid hydrocarbon distributed therethrough, then heating the composition to a temperature sufficiently high to liquefy the included hydrocarbon, and thereafter immersing the hot composition in a liquefied body of the same hydrocarbon.

Signed by me at Boston, Massachusetts this tenth day of December 1909.

WILLIAM R. SEIGLE.

Witnesses:
CHARLES D. WOODBERRY,
JOSEPHINE H. RYAN.